(12) United States Patent
Curless (10) Patent No.: US 9,321,496 B2
(45) Date of Patent: Apr. 26, 2016

(54) BICYCLE SEAT

(71) Applicant: Craig Curless, Indianapolis, IN (US)

(72) Inventor: Craig Curless, Indianapolis, IN (US)

(*) Notice: Subject to any disclaimer, the term of this patent is extended or adjusted under 35 U.S.C. 154(b) by 0 days.

(21) Appl. No.: 14/311,245

(22) Filed: Jun. 21, 2014

(65) Prior Publication Data

US 2014/0375092 A1    Dec. 25, 2014

Related U.S. Application Data

(60) Provisional application No. 61/838,117, filed on Jun. 21, 2013.

(51) Int. Cl.
*B62J 1/00* (2006.01)

(52) U.S. Cl.
CPC ........................ *B62J 1/005* (2013.01)

(58) Field of Classification Search
CPC .................................. B62J 1/005; B62J 1/008
USPC ....................................................... 297/201
See application file for complete search history.

(56) References Cited

U.S. PATENT DOCUMENTS

| | | | | |
|---|---|---|---|---|
| 572,062 A * | 11/1896 | Peck | | 297/201 |
| 603,734 A * | 5/1898 | Peck et al. | | 297/201 |
| 604,347 A * | 5/1898 | Bray | | 297/201 |
| 615,223 A * | 11/1898 | Peci | | 297/201 |
| 694,875 A * | 3/1902 | Meighan | | 297/201 |
| 4,387,925 A * | 6/1983 | Barker et al. | | 297/201 |
| 4,512,608 A * | 4/1985 | Erani | | 297/201 |
| 4,541,668 A * | 9/1985 | Rouw | | 297/201 |
| 5,725,274 A * | 3/1998 | Bergmeister | | 297/201 |
| 5,988,740 A * | 11/1999 | Caraballo | | 297/201 |
| 6,357,825 B1 * | 3/2002 | Bavaresco | | 297/201 |
| 6,379,285 B1 * | 4/2002 | Maresh et al. | | 482/57 |
| 6,402,235 B1 * | 6/2002 | Letendre | | 297/195.1 |
| 6,575,529 B1 * | 6/2003 | Yu | | 297/201 |
| 6,761,400 B2 | 7/2004 | Hobson | | |
| 6,926,645 B1 * | 8/2005 | Stearns et al. | | 482/62 |
| 2009/0039688 A1 * | 2/2009 | Wyner et al. | | 297/219.11 |
| 2012/0086246 A1 * | 4/2012 | Belliveau | | 297/201 |

FOREIGN PATENT DOCUMENTS

EP          467541 A1 *   1/1992

* cited by examiner

*Primary Examiner* — Laurie K Cranmer (57) ABSTRACT

The present invention relates to a bicycle seat including two or more support cushions. Two support cushions are independently rotatable to move with a bicycle rider's legs, and comprise angled portions that support the rider's buttocks and upper thighs. Another fixed cushion supports the genital and perineal areas of a rider's anatomy.

7 Claims, 7 Drawing Sheets

BICYCLE SEAT

CROSS-REFERENCE TO RELATED APPLICATIONS

The benefit of U.S. Provisional Patent Application No. 61/838,117 (filed Jun. 21, 2013) is claimed, and that provisional application is hereby incorporated by reference.

STATEMENT REGARDING FEDERAL SPONSORED RESEARCH OR DEVELOPMENT

Not Applicable.

REFERENCE TO SEQUENCE LISTING, ETC.

Not Applicable.

FIELD OF THE DISCLOSURE

This invention relates in general to bicycle seats, also known as bicycle saddles, and in particular to bicycle seats which support the rider with two or more separate cushions.

BACKGROUND OF THE INVENTION

Bicycles have evolved and today we have fast and lightweight bicycles with tear drop shaped seats upon which riders can efficiently transfer energy from their legs to the wheels of the bicycle. However, there is also a class of bicycles called cruiser bicycles where comfort is paramount and efficient energy transfer is secondary. On cruiser bicycles, the center of the pedal crank is typically more forward of the seat than the pedal crank on a racing bike, street bike, mountain bike, or cross bike. Riders of cruiser bicycles tend to sit more upright than riders of other types of bicycles.

Bicycle seats come in many shapes and forms. A typical bicycle seat is shaped like a tear drop or a pear, with a wider portion of the seat that supports the buttocks and a narrower or pointed portion that fits between a rider's legs called the nose or the horn. A problem with typical bicycle seats is that they tend not to provide support to riders where it is needed and extended riding on a seat with a nose or horn can put undue pressure on the rider's anatomy where the nose or horn of the of the seat meets the rider's body.

The nose of a typical bicycle seat meets the rider's anatomy in the area of the genitals and the perineum. It has been advanced that the weight of a rider on a typical bicycle seat can force the hip bones apart and put undue pressure on the nerves and blood vessels passing through the pudendal canal and in the case of a male rider, compress the penile artery. Prolonged riding on a typical bicycle seat is not only uncomfortable, it is believed that prolonged riding on this type of seat may cause permanent damage to the rider's anatomy and may even cause sexual dysfunction in some male riders.

It is desirable on cruiser bicycles and can be desirable on other types of bicycles to have a seat that alleviates pressure points on a rider's anatomy, distributes the rider's weight, reduces risk of chafing, and is easy for the rider to use. Such a seat is also desirable for use by older, less healthy, or overweight individuals that often use three wheeled bicycles, and such a seat can also be used by such individuals to comfortably exercise on stationary exercise bicycles.

The need for a comfortable seat that minimizes pressure points and maximizes comfort has been recognized in the past and there have been a number of attempts to design a bicycle seat with support where it is needed most. One approach has been to provide a seat without a nose that has two support portions or cushions. However, that type of seat does not provide any support for the genital and perineal areas of the human anatomy and is not well suited to accommodate the anatomies of riders of varying widths, particularly those who are very large or overweight.

An object of the invention is to provide comfortable seating while bicycling. Another object of the invention is to provide a seat that supports the rider's anatomy without undue pressure on the genital and perineal areas. A further object of the invention is to provide a bicycle seat that is comfortable and easy to use that does not require manual or other adjustment means and mechanisms to accommodate individuals of varying widths.

SUMMARY OF THE INVENTION

According to the present invention, the foregoing and other objects and advantages are attained by a bicycle seat with a frame, a first cushion, a second cushion, and a center cushion. The frame includes a horizontal member, a first member, a second member, and a center member. The first member can attached to a distal end of the horizontal member, the second member attached to the opposite distal end of the horizontal member, and the center member attached to the horizontal member midway between the first member and the second member. The first cushion includes a first support portion and a second support portion disposed at an angle to the first portion, the first cushion being rotatably mounted between the first member and the center member. The second cushion includes a first support portion for a rider's buttock, and a second support portion disposed at an angle to the first support portion for a rider's upper thigh, the second cushion being rotatably mounted between the second member and the center member.

The center cushion can includes a first top portion and a second top portion disposed at an angle to the first top portion, the center cushion disposed upon and attached to the center member. The center cushion includes a first top portion and a second top portion disposed at an angle to the first top portion of 15 degrees to 25 degrees. The center cushion provides support to the genital and perineal areas of a rider's anatomy, but without the undue pressure of the "nose" of a typical conventional teardrop style bicycle seat.

In accordance with another aspect of the invention, the first cushion includes a first support portion and a second support portion disposed at an angle to the first portion of at an angle of 20 degrees to 35 degrees. The second cushion includes a first support portion and a second support portion disposed at an angle to the first portion of at an angle of 20 degrees to 35 degrees. The configuration of the cushions allows a rider's body weight to be evenly distributed. Advantageously, the bicycle seat allows unobstructed pedaling movement of the legs, so the rider may operate the pedals of the bicycle comfortably and efficiently.

DESCRIPTION

For the purpose of promoting an understanding of the principles of the present invention, reference will now be made to the embodiment illustrated in specific language contained herein. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Figure 1:
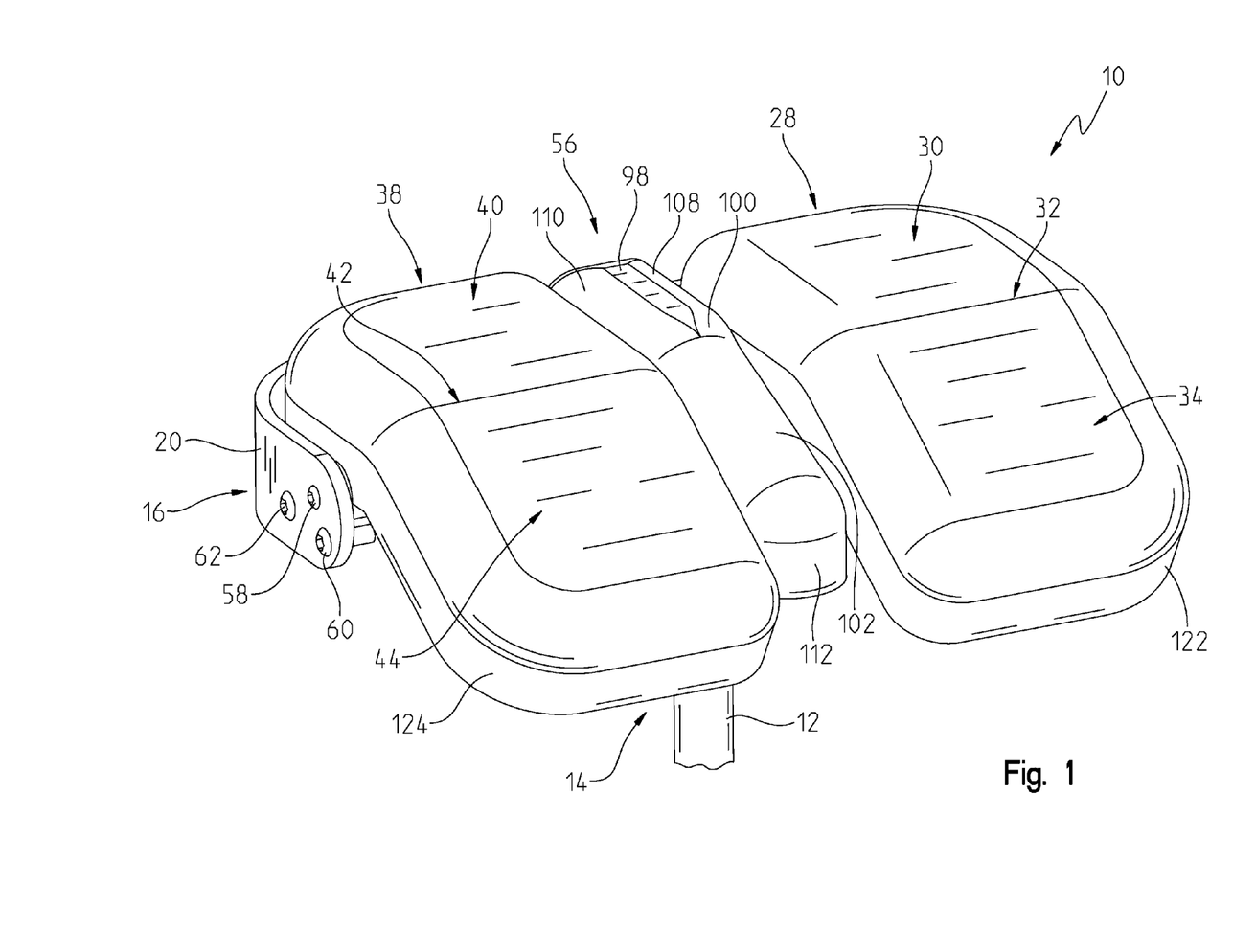
FIG. 1 is a perspective view of bicycle seat.

The bicycle seat 10 of the preferred embodiment, FIGS. 1-8, may be provided with a frame 16, a first cushion 28, a second cushion 38, and a center cushion 56. First cushion 28 and the second cushion 38 are adapted to be freely movable relative to each other and independent of each other and are pivotably attached to frame 16. As shown in FIG. 1, center cushion 56 is disposed between the first cushion 28 and the second cushion 38, and center cushion may be removably or fixedly attached to frame 16.

Figure 6:
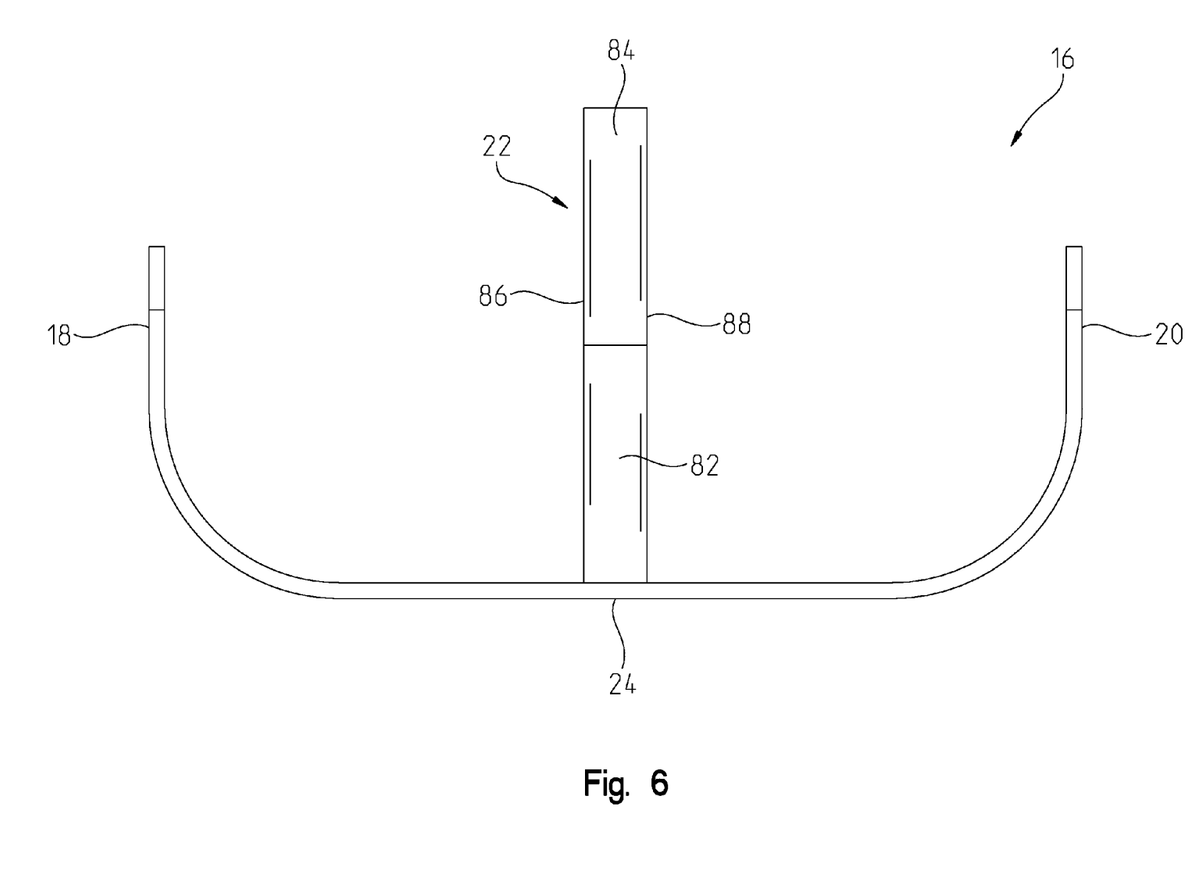
FIG. 6 is a top view of the frame.
Figure 7:
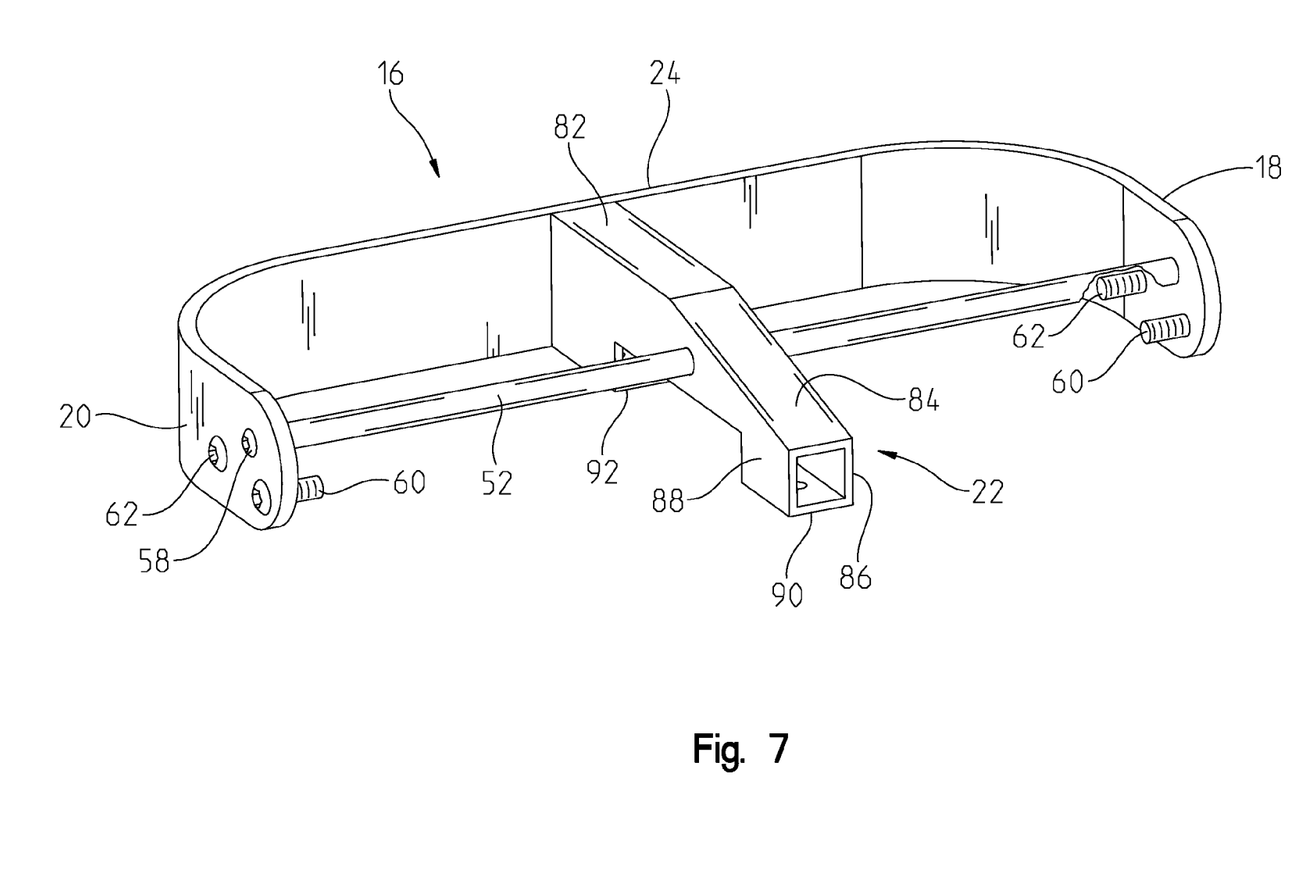
FIG. 7 is a perspective view of the frame.

Referring to FIGS. 6 and 7, frame 16 comprises a horizontal member 24, a first member 18, a second member 20, and a center member 22. As viewed from the top, frame 16 is generally W shaped. First member 18, second member 20, and center member 22 are generally disposed in the same plane and are generally parallel with, respect to each other, and are generally perpendicular to horizontal member 24. First member 18 is connected to one distal end of horizontal member 24 and second member 20 is connected to the opposite distal end of horizontal member 24. In the preferred embodiment, first member 18, horizontal member 24, and second member 20 are formed from a single piece of structural material that is bent or formed generally into the shape of an elongated U. Center member 22 is disposed approximately midway between first member 18 and second member 20, and center member 22 is permanently attached to horizontal member 24 by any conventional method such as welding, although center member 22 may be removably attached to horizontal member 24 by any conventional fastener such as screws, bolts, or rivets.

Referring to FIGS. 6 and 7, center member 22 includes a first top wall 82, a second top wall 84, a first side wall 86, a second side wall 88, a first bottom wall 90, and a second bottom wall 92. First top wall 82 is disposed in a plane that is generally perpendicular to the planes in which first side wall 86 and second side wall 88 are disposed. First bottom wall 90 and second bottom wall 92 are generally disposed in the same plane, and first top wall 82 is disposed in a plane that is generally parallel with the plane in which first bottom wall 90 and second bottom wall 92 is disposed.

First top wall 82 and second top wall 84 each have two long edges, and two end edges. One end edge of first top wall 82 is adjacent to or connected to horizontal member 24 and the opposite end edge of first top wall 82 is connected to an end edge of second top wall 84. Second top wall 84 is downwardly sloping with respect to first top wall 82, preferably at an angle of approximately 15 degrees, but optionally at an angle from 10 to 20 degrees, inclusive. The top edge of first side wall 86 is attached to a long edge of first top wall 82 and to the contiguous long edge of second top wall 84. The top edge of second side wall 88 is attached to the opposite long edge of first top wall 82 and to the contiguous long edge of second top wall 84. First side wall 86 and second side wall 88 include first hole 94 and a second hole 96, respectively, for receiving shaft 52.

Figure 3:
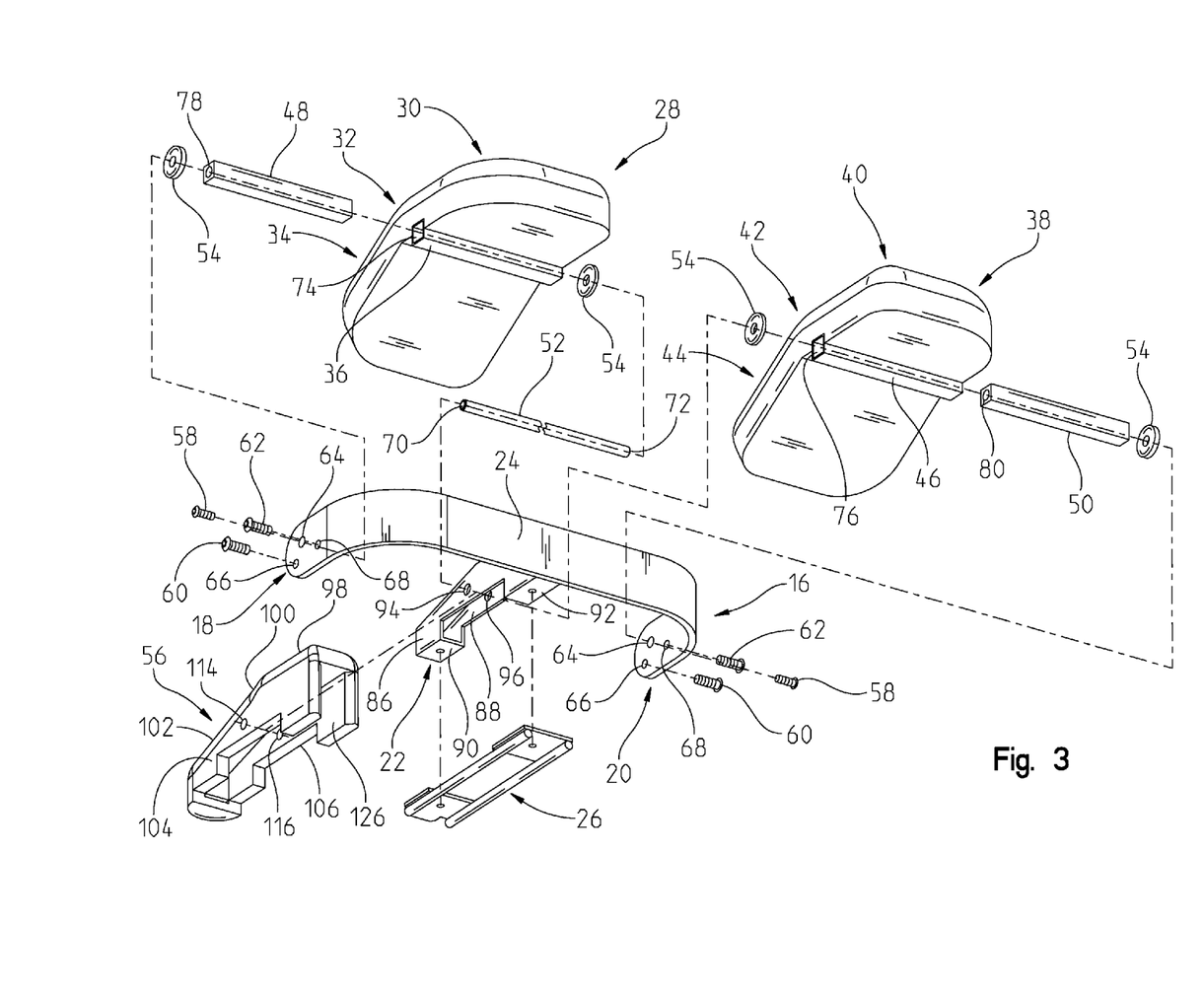
FIG. 3 is an exploded view of the bicycle seat showing its various components.
Figure 8:
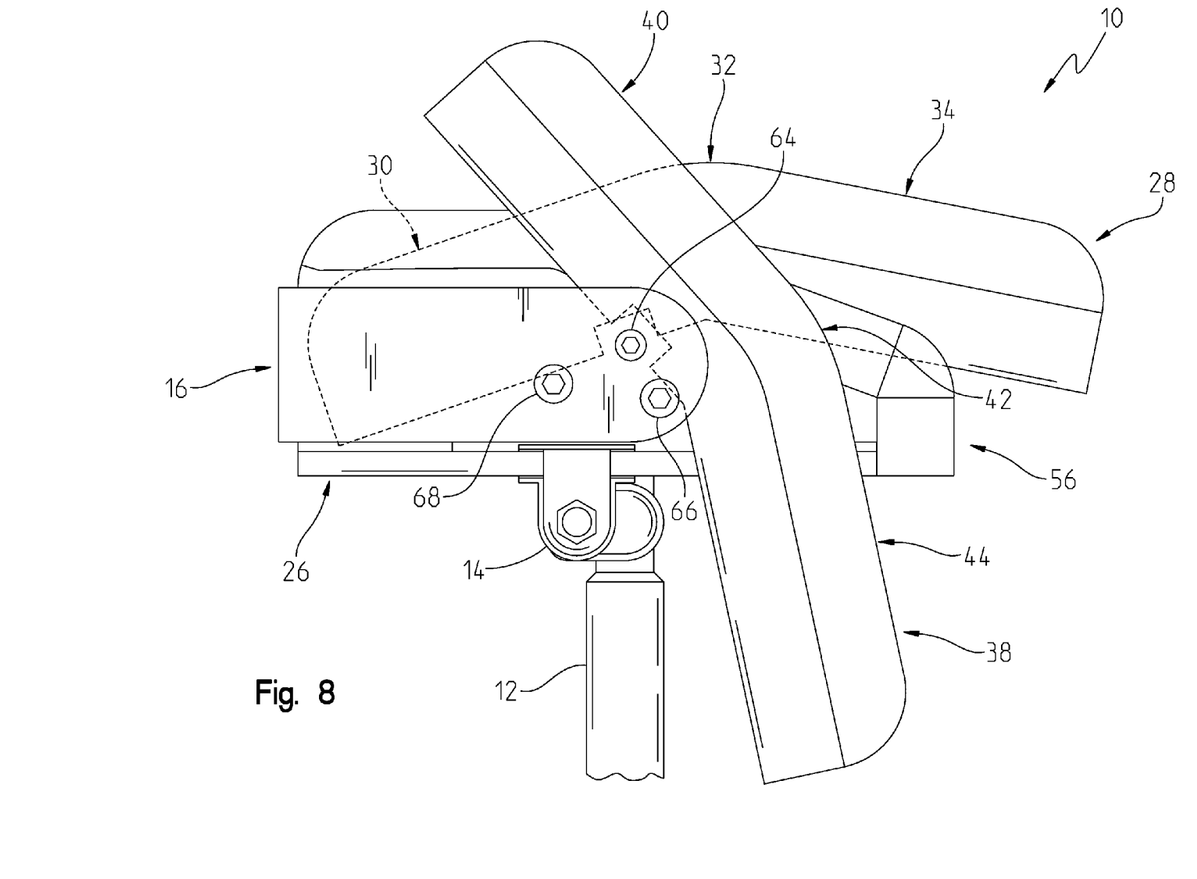
FIG. 8 is a side view of the bicycle seat attached to a standard bicycle mounting clamp and seat post showing one cushion in an upwardly tilted position and one cushion in a downwardly tilted position.

First bottom wall 90 and second bottom wall 92 are provided for attachment to a pair of rails 26. Rails 26 are well known in the art as one means to attach a bicycle seat to a standard bicycle mounting clamp, and rails 26 are sized and dimensioned for attachment to and use with a standard bicycle seat mounting clamp 14, as shown in FIG. 8. First bottom wall 90 and second bottom wall 92 can be apertured, as shown in FIG. 3. First bottom wall 90 and second bottom wall 92 are each attached to a bottom edge of first side wall 86 and a bottom edge of second side wall 88 in locations suitable for attachment to rails 26.

The bottom of the human pelvis has two protrusions called the ischial tuberosities, commonly referred to as the sit bones. When a human sits their buttocks on a flat surface, these sit bones carry most of the load of the weight of the human. A wide padded bench can be a comfortable seat, but such a bench would interfere with pedaling if used as a seat on a bicycle. First cushion 28 and of second cushion 38 are configured to provide the comfort of a wide padded bench while not interfering with pedaling of the bicycle.

Figure 4:
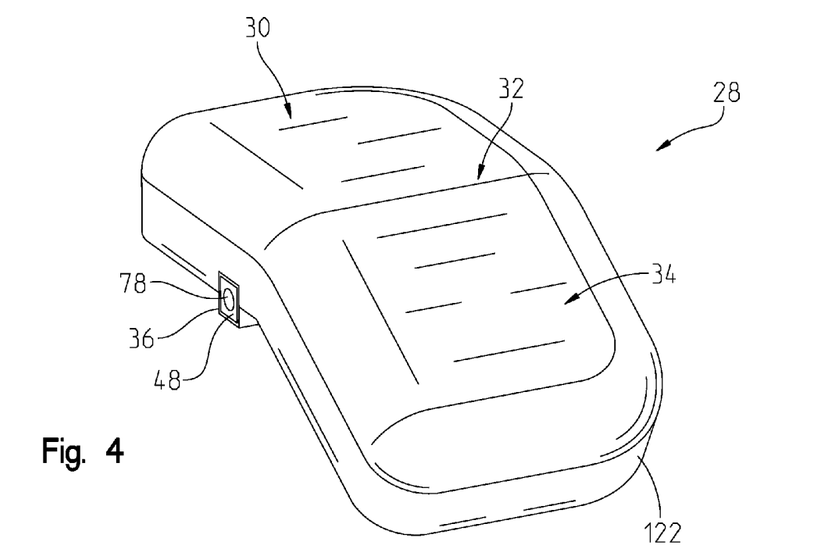
FIG. 4 is a perspective view of a cushion.

As shown in FIG. 4, first cushion 28 comprises a first support portion 30, an angled portion 32, and a second support portion 34. When riding, a rider's buttock meets first support portion 30 and first support portion 30 supports weight of the rider transferred through a sit bone. When riding, a rider's upper thigh meets with second support portion 34 and second support portion 34 supports the rider's upper thigh without interfering with the pedaling motion of the rider's leg. The plane of the top surface of first support portion 30 and the plane of the top surface of second support portion 34 converge in the angled portion 32 of first cushion 28. Angled portion 32 provides support to the area of a rider's anatomy where a buttock meets an upper thigh. The forward outboard portion 122 of first cushion 28 is radiused for rider comfort, particularly when mounting and dismounting the bicycle seat 10. Observation and trial and error testing have revealed that the range of optimal comfort for the angle of the plane of the top surface of second support portion 34 relative to the plane of the top surface of first support portion 30 is from 20 degrees to 35 degrees, inclusive, and is preferably 30 degrees.

Figure 2:
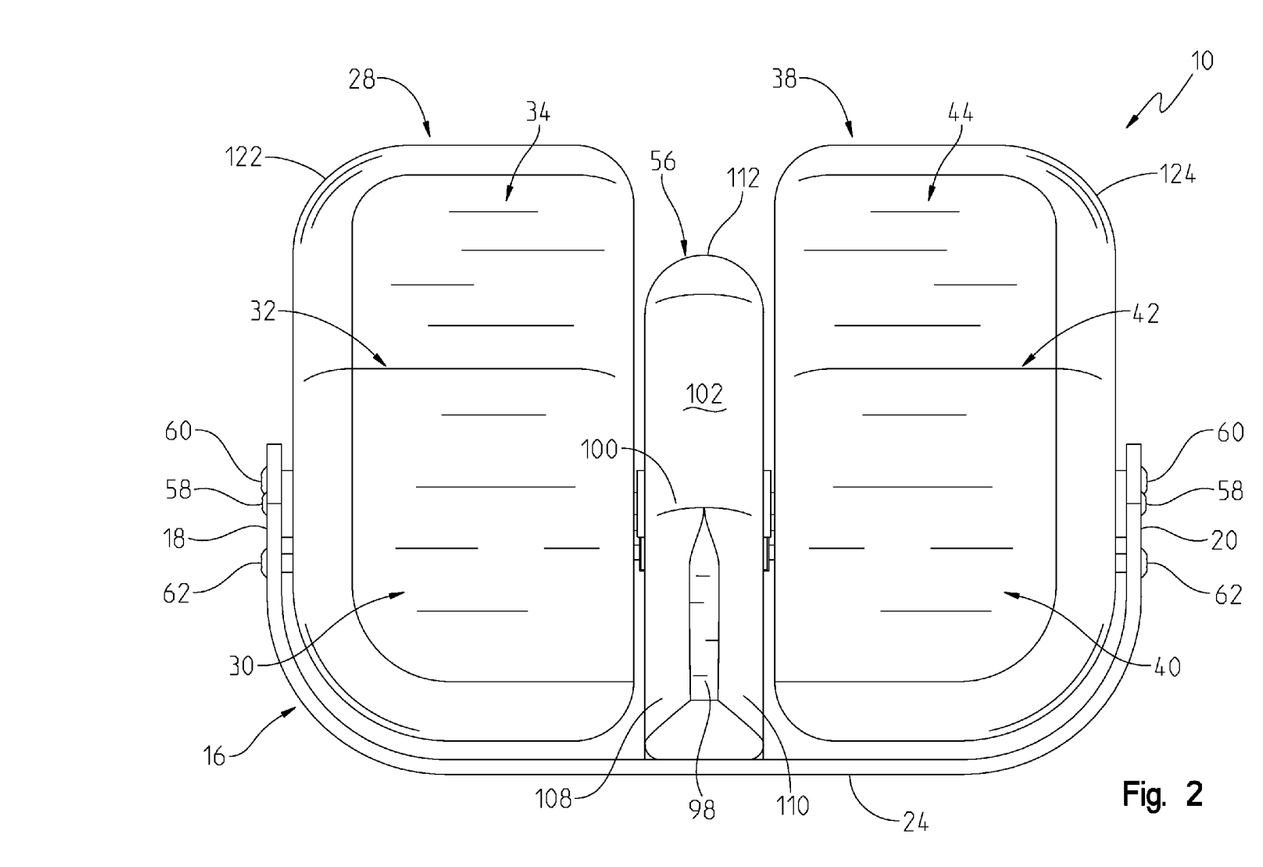
FIG. 2 is a top view of the bicycle seat.

As shown in FIGS. 1, 2, and 3, second cushion 38 is a mirror image of first cushion 28. Second cushion 38 comprises a first support portion 40, an angled portion 42, and a second support portion 44. When riding, a rider's buttock meets first support portion 40 and first support portion 40 supports weight of the rider transferred through a sit bone. When riding, a rider's upper thigh meets with second support portion 44 and second support portion 44 supports the rider's upper thigh without interfering with the pedaling motion of the rider's leg. The plane of the top surface of first portion 40 and the plane of the top surface of second support portion 44 converge in the angled portion 42 of second cushion 38. Angled portion 42 provides support to the area of a rider's anatomy where a buttock meets an upper thigh. The forward outboard portion 124 of second cushion 38 is radiused for rider comfort, particularly when mounting and dismounting the bicycle seat 10. Observation and trial and error testing have revealed that the range of optimal comfort for the rider for the angle of the plane of the top surface of second support portion 44 relative to the plane of the top surface of first support portion 40 is from 20 to 35 degrees, inclusive, and is preferably 30 degrees.

First cushion 28 and second cushion 38 each can be integrally formed and each may include rubber or plastic foam padding, preferably 1 to 3 inches thick, that conforms to and supports a rider's anatomy. A typical bicycle seat provides approximately 27 square inches of support surface for the rider. First cushion 28 and second cushion 38 each provide approximately 50 square inches of support area for a total of approximately 100 square inches of support area, a large enough area to accommodate the buttocks of nearly any individual regardless of size without the need for lateral adjustment.

Figure 5:
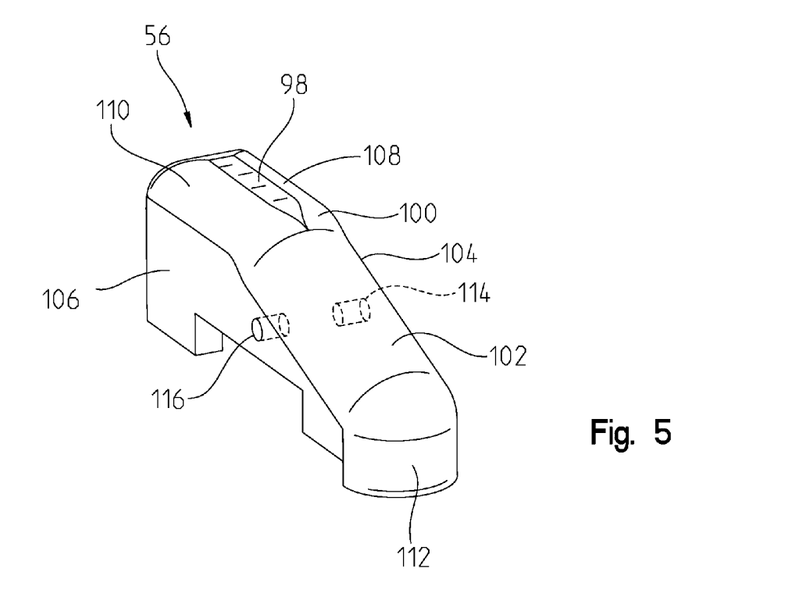
FIG. 5 is a perspective view of the center cushion.

Referring to FIGS. 2, 3, and 5, center cushion 56 may be rubber or plastic foam, preferably from 0.5 to 1.5 inches thick, and its thickness may vary throughout center cushion 56. Center cushion 56 includes an inner surface 126 that conforms generally to the shape of center member 22. Center cushion 56 has a first top portion 98, an angled portion 100, a second top portion 102, a first side portion 104, a second side portion 106, a first radiused portion 108, a second radiused portion 110, and a forward radiused portion 112. The plane in which first top portion 98 is disposed is generally parallel to the plane in which first top wall 82 of center member 56 is disposed. The planes in which first side portion 104 and second side portion 106 are disposed are generally parallel with each other and generally perpendicular to first top wall 82 of center member 22. First radiused portion 108 connects first top portion 98 with first side portion 104. Second radiused portion 110 connects first top portion 98 with second side portion 106. At their forward ends, first top portion 98, first radiused portion 108, and second radiused portion 110 converge with second top portion 102.

Second top portion 102 is radiused for rider comfort. Second top portion 102 is downwardly sloped relative to the plane in which first top portion 98 is disposed at an angle of 15 to 25 degrees, preferably at an angle of 20 degrees. Second top portion 102 connects with first side portion 104 and with second side portion 106, and second top portion converges with forward radiused portion 112 which is rounded and radiused for rider comfort.

Center cushion 56 may be removably or fixedly attached to center member 22. In the preferred embodiment, first side portion 104 includes a hole 114 and second side portion 106 includes a hole 116. Holes 114 and 116 are positioned so as to be coaxially aligned with first hole 94 and second hole 96 of center member 22 when center cushion 56 is affixed to center member 22. When assembled, shaft 52 is disposed within holes 114 and 116 and holes 114 and 116 serve to hold center cushion 56 in position on center member 22.

As shown in FIG. 3, first member 18 includes a first threaded hole 66 for receiving a forward limit pin 60 and a second threaded hole 68 for receiving an aft limit pin 62. First member 18 also includes a hole 64 for receiving a shaft screw 58. Second member 20 includes a first threaded hole 66 for receiving a forward limit pin 60 and a second threaded hole 68 for receiving an aft limit pin 62. In the preferred embodiment, forward limit pins 60 and aft limit pins 62 are machine screws, but can also be bolts, pins, or any other protrusion. Second member 20 also includes a hole 64 for receiving a shaft screw 58.

Center member 22 includes a first hole 94 and a second hole 96. Holes 64 first hole 94, and second hole 96 are generally coaxially aligned for receiving and attaching shaft 72 to first member 18 and second member 20. Shaft 52 includes a first threaded hole 70 on one distal end and a second threaded hole 72 on the opposite distal end.

The construction of the bicycle seat can best be understood with reference to FIG. 3. First cushion 28 and second cushion 38 can each include lower first bushing housing 36 and lower second bushing housing 46, respectively, preferably located aft of angled portions 32 and 42 of first cushion 28 and second cushion 38, respectively. First bushing 48 is disposed within first bushing housing aperture 74 of first bushing housing 36. Second bushing 50 is disposed within second bushing housing aperture 76 of second bushing housing 46. First bushing 48 includes a cylandraceous bore 78 for receiving shaft 52 and second bushing 50 includes a cylandraceous bore 80, also for receiving shaft 52.

Center cushion 56 is disposed upon center member 22 by placing inner surface 126 in contact with first top wall 82, second top wall 84, first side wall 86, and second side wall 88. First cushion 28 is disposed between first member 18 and center member 22, and second cushion 38 is disposed between second member 20 and center member 22. Cylandraceous bores 78 and 80 are generally coaxially aligned with hole 64 of first member 18, hole 114, first hole 94, hole 116, and hole 64 of second member 20.

Washers 54 are disposed on shaft 52 between first member 18 and first bushing 48, between first bushing 48 and center member 22, between center member 22 and second bushing 50, and between second bushing 50 and second member 20. Washers 54 are generally coaxially aligned with hole 64 of first member 18, first hole 94, second hole and hole 64 of second member 20. Washers 54 serve as spacers and serve to allow first cushion 28 and second cushion 38 to freely and independently rotate through wide range of motion.

Shaft 52 is disposed in cylandraceous bore 78, hole 114, first hole 94, second hole 96, hole 116, and cylandraceous bore 80, and shaft 52 is generally coaxially aligned with threaded hole 62 of first member 18 and threaded hole 62 of second member 20. Shaft 52 includes a threaded hole 70 on one distal end and a threaded hole 72 on the opposite distal end. Shaft 52 is attached to first member 18 with a shaft screw 58 disposed within threaded hole 70 and is attached to second member 20 with a shaft screw 58 disposed within threaded hole 72.

When bicycle seat 10 is assembled, horizontal member 24 can be adjacent to the rear of first cushion 28 and second cushion 38. Advantageously, frame 16, including, horizontal member 24, can be used as an attachment or mounting point for a bag, a light, or other bicycle accessory. First member 18 can be adjacent to first cushion 28, and second member 20 can be adjacent to second cushion 38 thereby protecting first cushion 28 and second cushion 38, for example, when the bicycle falls to or is laid on the ground Referring to FIG. 3, rails 26 may be removably attached to frame 16 by screws, bolts, or other attachment means (not shown) or permanently attached to frame 16 in any conventional manner such as by welding. As shown in FIG. 8, seat frame 16 may be mounted on a seat post 12 of a bicycle with a standard bicycle mounting clamp 14 attached to the seat post 12 and to rails 26. Seat 10 may be adjusted backward or forward relative the bicycle pedals by loosening and retightening the bicycle mounting clamp on rails 26.

Because the rider's legs are connected to the pedals, which are disposed on opposite sides of the bottom bracket of the bicycle the downward motion of one leg corresponds to the upward motion of the other leg. First cushion 28 and second cushion 38 freely pivot and are rotatable about the axis of shaft 52. Referring to FIG. 8 and using second support portion 44 as a reference point, FIG. 8 shows the second cushion 38 is in the forwardly and downwardly tilted position corresponding to a rider's leg at the bottom of a pedal stroke. Using second support portion 34 as a reference, FIG. 8 shows the first cushion 28 is in the rearwardly and upwardly position corresponding to a rider's leg at the top of a pedal stroke. Forward limit pins 60 limit the forward and downward rotation of first cushion 28 and second cushion 38. Aft limit pins 62 limit the rearward and upward rotation of first cushion 28 and second cushion 38. In the preferred embodiment, the range of motion of first cushion 28 and of second cushion 38 is approximately 67 degrees of rotation.

First cushion 28 and second cushion 38 comfortably support and distribute most of a rider's weight as the cushions pivotably move with the rider's legs as the rider pedals up and down. Center cushion 56 provides support to the genital and perineal areas of a rider while a rider is riding and also while a rider is stopped astraddle the bicycle. The pressure on the rider's genital and perineal areas is substantially reduced by the weight of the rider that is supported by first cushion 28 and second cushion 38, thereby substantially reducing or even eliminating the potential for the types of injury to a rider's anatomy that can be caused by the nose or horn of a typical bicycle seat.

While the invention has been illustrated and described in detail with the foregoing description, the same is to be considered as illustrative and not restrictive in character, it being understood that while the preferred embodiment has been described, that all changes and modifications that come within the spirit of the invention are desired to be protected.

What is claimed is:

1. A bicycle seat comprising:
   a frame, a first cushion, a second cushion, and a center cushion, the frame including a horizontal member, a first member, a second member, and a center member, the first member attached to a distal end of the horizontal member, the second member attached to the opposite distal end of the horizontal member, and the center member attached to the horizontal member midway between the first member and the second member;
   b) the first cushion including, a first support portion and a second support portion disposed at an angle to the first support portion, the first cushion being rotatably mounted between the first member and the center member;
   c) the second cushion including a first support portion and a second support portion disposed at an angle to the first support portion, the second cushion being rotatably mounted between the second member and the center member;
   d) the center cushion including a first top portion and a second top portion disposed at an angle to the first top portion, the center cushion disposed upon and attached to the center member; and, wherein
   e) the first member, the second member, and the center member are disposed in the same plane and are parallel with respect to each other and are perpendicular to the horizontal member.

2. A bicycle seat comprising:
   a) a frame, a first cushion, a second cushion, and a center cushion, the frame including a horizontal member, a first member, a second member and a center member, the first member attached to a distal end of the horizontal member, the second member attached to the opposite distal end of the horizontal member, and the center member attached to the horizontal member midway between the first member and the second member;
   b) the first cushion including a first support portion and a second support portion disposed at an angle to the first support portion, the first cushion being rotatably mounted between the first member and the center member;
   c) the second cushion including a first support portion and a second support portion disposed at an angle to the first support portion, the second cushion being rotatably mounted between the second member and the center member;
   d) the center cushion including first top portion and a second top portion disposed at an angle to the first top portion, the center cushion disposed upon and attached to the center member; and
   e) the first member including a first limit pin and a second limit pin, whereby the first limit pin stops the rotation of the first cushion in one direction and the second limit, pin stops the rotation of the first cushion in the opposite direction.

3. The bicycle seat of claim 2, the second member including a first limit pin and a second limit pin, whereby the first limit pin stops the rotation of the second cushion in one direction and the second limit pin stops the rotation of the second cushion in the opposite direction.

4. The bicycle at of claim 3, wherein the first cushion and the second cushion independently rotate up to 67 degrees.

5. A bicycle seat comprising:
   a) a frame, a first cushion, a second cushion, and a center cushion, the frame including a horizontal member, a first member, a second member, and a center member, the first member attached to a distal end of the horizontal member, the second member attached to the opposite distal end of the horizontal member, and the center member attached to the horizontal member midway between the first member and the second member;
   b) means for rotatably mounting the first cushion between first member and the center member;
   c) means for rotatably mounting the second cushion between the second member and the center member;
   d) means for attaching the center cushion to the center member; and
   e) the first member including a first limit pin and a second limit pin, whereby the first limit pin stops the rotation of the first cushion in one direction and the second limit pin to stops the rotation of the first cushion in the opposite direction.

6. The bicycle seat of claim 5, the second member including a first limit pin and a second limit pin, whereby the first limit pin stops the rotation of the second cushion in one direction and the second limit pin stops the rotation of the second cushion in the opposite direction.

7. The bicycle seat of claim 6, wherein the first cushion and the second cushion independently rotate up to 67 degrees.

* * * * *